United States Patent
Lee et al.

(10) Patent No.: US 11,693,729 B2
(45) Date of Patent: Jul. 4, 2023

(54) CONTROLLER AND OPERATING METHOD THEREOF

(71) Applicant: SK hynix Inc., Gyeonggi-do (KR)

(72) Inventors: Joung Young Lee, Gyeonggi-do (KR); Dong Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/022,612

(22) Filed: Sep. 16, 2020

(65) Prior Publication Data
US 2021/0326201 A1    Oct. 21, 2021

(30) Foreign Application Priority Data

Apr. 16, 2020    (KR) .................. 10-2020-0046190

(51) Int. Cl.
*G06F 11/10*    (2006.01)
*G06F 7/58*    (2006.01)
*G06F 11/22*    (2006.01)

(52) U.S. Cl.
CPC .......... *G06F 11/1004* (2013.01); *G06F 7/588* (2013.01)

(58) Field of Classification Search
None
See application file for complete search history.

(56) References Cited

U.S. PATENT DOCUMENTS

| | | | | | |
|---|---|---|---|---|---|
| 5,691,997 A | * | 11/1997 | Lackey, Jr. | ......... | H03M 13/091 370/473 |
| 5,898,712 A | * | 4/1999 | Kodama | ................. | G06F 11/10 714/757 |
| 6,697,276 B1 | * | 2/2004 | Pereira | .................... | G11C 15/00 365/189.07 |
| 7,523,305 B2 | * | 4/2009 | Skovira | ................. | H04L 1/0061 340/5.23 |
| 10,320,522 B2 | * | 6/2019 | Jeong | .................... | H03M 13/13 |
| 2002/0053059 A1 | * | 5/2002 | Hara | ................. | H03M 13/6516 714/758 |
| 2002/0184273 A1 | * | 12/2002 | Katsunori | ............... | G06F 7/588 708/250 |

(Continued)

FOREIGN PATENT DOCUMENTS

| KR | 10-2014-0057454 | 5/2014 |
|---|---|---|
| KR | 10-1420754 | 7/2014 |

*Primary Examiner* — Cynthia Britt
*Assistant Examiner* — Dipakkumar B Gandhi
(74) *Attorney, Agent, or Firm* — IP & T Group LLP

(57) ABSTRACT

There are provided a controller, an electronic system including the same, and an operating method of the controller and the memory system. The controller includes: a randomizing circuit configured to generate random data having a set number of bits; a masking circuit configured to output select random data by extracting some data according to a number of bits on which a partial encoding operation is to be performed, among the random data; an operating circuit configured to output encoded data and a portion of original data, by performing an operation sequentially on the original data and the select random data; and a cyclic redundancy check circuit configured to generate a cyclic redundancy check value by performing a cyclic redundancy check on the encoded data and the portion of original data, and output partially encoded data including the cyclic redundancy check value, the portion of original data, and the encoded data.

14 Claims, 10 Drawing Sheets

(56) References Cited

U.S. PATENT DOCUMENTS

| | | | | |
|---|---|---|---|---|
| 2003/0066016 A1* | 4/2003 | Wehage | ............... | H04L 1/0061 |
| | | | | 714/781 |
| 2004/0073861 A1* | 4/2004 | Lauer | ................... | H04L 1/0071 |
| | | | | 714/762 |
| 2004/0131186 A1* | 7/2004 | Kasuya | ................ | H04L 9/3242 |
| | | | | 380/255 |
| 2005/0058079 A1* | 3/2005 | Utsunomiya | ....... | G06F 11/0793 |
| | | | | 370/242 |
| 2005/0193193 A1* | 9/2005 | Skovira | ................ | H04L 9/0662 |
| | | | | 713/160 |
| 2008/0104475 A1* | 5/2008 | Pietraski | ............... | H04L 1/0045 |
| | | | | 714/752 |
| 2010/0017692 A1* | 1/2010 | Kwak | ................ | H03M 13/091 |
| | | | | 714/807 |
| 2010/0194609 A1* | 8/2010 | Meyer | ................ | G06F 11/1008 |
| | | | | 341/52 |
| 2011/0004817 A1* | 1/2011 | Cheong | .............. | G06F 11/1004 |
| | | | | 714/807 |
| 2012/0096508 A1* | 4/2012 | Kim | .................. | H04N 21/4332 |
| | | | | 725/118 |
| 2012/0290769 A1* | 11/2012 | Okubo | ................ | G06F 12/0246 |
| | | | | 711/103 |
| 2014/0068149 A1* | 3/2014 | Kanamori | ............ | G11C 7/1006 |
| | | | | 711/103 |
| 2017/0075755 A1* | 3/2017 | Yang | .................... | H03M 13/13 |
| 2017/0132069 A1* | 5/2017 | Wang | ................ | G06F 11/0793 |
| 2017/0170845 A1* | 6/2017 | Cho | ....................... | H03M 13/09 |
| 2019/0340068 A1* | 11/2019 | Bhatia | ................ | G06F 11/1068 |

* cited by examiner

CONTROLLER AND OPERATING METHOD THEREOF

CROSS-REFERENCE TO RELATED APPLICATION

The present application claims priority under 35 U.S.C. § 119(a) to Korean patent application number 10-2020-0046190, filed on Apr. 16, 2020, which is incorporated herein by reference in its entirety.

BACKGROUND

Field of Invention

The present disclosure generally relates to a controller and an operating method thereof, and more particularly, to a controller capable of performing an encoding operation and an operating method of the controller.

Description of Related Art

An electronic system includes a memory system capable of storing data and a host capable of controlling the memory system.

The memory system includes a memory device capable of storing data and a controller capable of controlling the memory device in response to a request of the host.

The memory device includes a plurality of memory cells in which data is stored. The memory cells may be implemented as volatile memory cells in which stored data disappears when the supply of power is interrupted, or be implemented as nonvolatile memory cells in which stored data is retained even when the supply of power is interrupted.

Recently, as portable electronic devices are increasingly used, memory devices configured with nonvolatile memory cells have been increasingly used. Due to miniaturization of electronic devices, highly integrated, large capacity memory devices for use in the electronic devices are required.

The controller may communicate data between the host and the memory device. For example, the controller may map an address used in the host and an address used in the memory device to each other, and transmit information (mapping information) obtained by mapping the addresses to the host.

The host may store mapping information output from the memory system, and output mapping information stored in a read operation to the memory system.

As described above, when the host stores mapping information, and transfers mapping information in a read operation to the memory system, the controller in the memory system may use address mapping and perform the read operation according to the mapping information received from the host. Thus, the operation time of the memory system can be reduced.

SUMMARY

Embodiments provide a controller capable of encoding and outputting only a portion of information, when the information is output to the host, and an operating method of the controller.

In accordance with an aspect of the present disclosure, there is provided a controller including: a randomizing circuit configured to generate random data having a set number of bits; a masking circuit configured to output select random data by extracting some data according to a number of bits on which a partial encoding operation is to be performed, among the random data; an operating circuit configured to output encoded data and a portion of original data, by performing an operation sequentially on the original data and the select random data; and a cyclic redundancy check circuit configured to generate a cyclic redundancy check value by performing a cyclic redundancy check on the encoded data and the portion of original data, and output partially encoded data including the cyclic redundancy check value, the portion of original data, and the encoded data.

In accordance with another aspect of the present disclosure, there is provided a controller including: an encoder configured to generate select random data having a number of bits less than that of original data, generate encoded data by selectively encoding data corresponding to the select random data among the original data, and output, to a host, partially encoded data including the encoded data and remaining original data except the encoded data among the original data; and a decoder configured to recover, as the original data, the partially encoded data output from the host.

In accordance with still another aspect of the present disclosure, there is provided a method for operating a controller, the method including: generating random data having first to Ath bits; extracting, as select random data, data corresponding to first to Bth bits among the random data, and maintaining, as an empty area, a memory area corresponding to (B+1)th to Ath bits; generating encoded data having the first to Bth bits by performing an operation on original data having the first to Ath bits and the select random data; and outputting the encoded data and remaining original data corresponding to the (B+1)th to Ath bits among the original data.

In accordance with still another aspect of the present disclosure, there is provided a method for operating an electronic system, the method including: transmitting a program request together with data to a memory system in a program operation; programming the data in a memory device, and generating mapping information by mapping a physical address at which the data are stored and a logical address corresponding to the physical address, when the data and the program request are received; generating encoded data by selectively encoding the physical address among original data including the mapping information and the physical address, and transmitting, to a host, the mapping information, the encoded data, and the logical address; transmitting the mapping information, the encoded data and the logical address to the memory system in a read operation; recovering the encoded data; and performing the read operation by using the recovered data.

In accordance with still another aspect of the present disclosure, there is provided a method for operating a controller, the method including: generating original data including first and second pieces, the second piece including a physical address; encrypting the original data to generate encrypted data by performing a logical operation on the second piece with random data; exchanging, with an external device, the encrypted data along with a logical address; and decrypting the encrypted data to recover the original data by performing the logical operation on the encrypted second piece with the random data, wherein the encrypting includes generating the random data selected from data that includes at least the logical address and is randomized, and wherein the logical address corresponds to the physical address.

BRIEF DESCRIPTION OF THE DRAWINGS

Example embodiments are described more fully below with reference to the accompanying drawings; however, the invention may be embodied in different forms and thus should not be construed as limited to the embodiments set forth herein. Rather, these embodiments are provided so that this disclosure is thorough and complete, and fully conveys the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Throughout the specification, reference to "an embodiment," "another embodiment" or the like is not necessarily to only one embodiment, and different references to any such phrase are not necessarily to the same embodiment(s). The term "embodiments" when used herein does not necessarily mean all embodiments.

DETAILED DESCRIPTION

In the present disclosure, advantages, features and methods for achieving them will become more apparent after reading the following embodiments taken in conjunction with the drawings. The present invention may, however, be embodied in different forms and thus should not be construed as being limited to any of the embodiments set forth herein. Rather, these embodiments are provided to describe the present disclosure in detail to enable those skilled in the art to which the disclosure pertains to practice the present invention.

Figure 1:
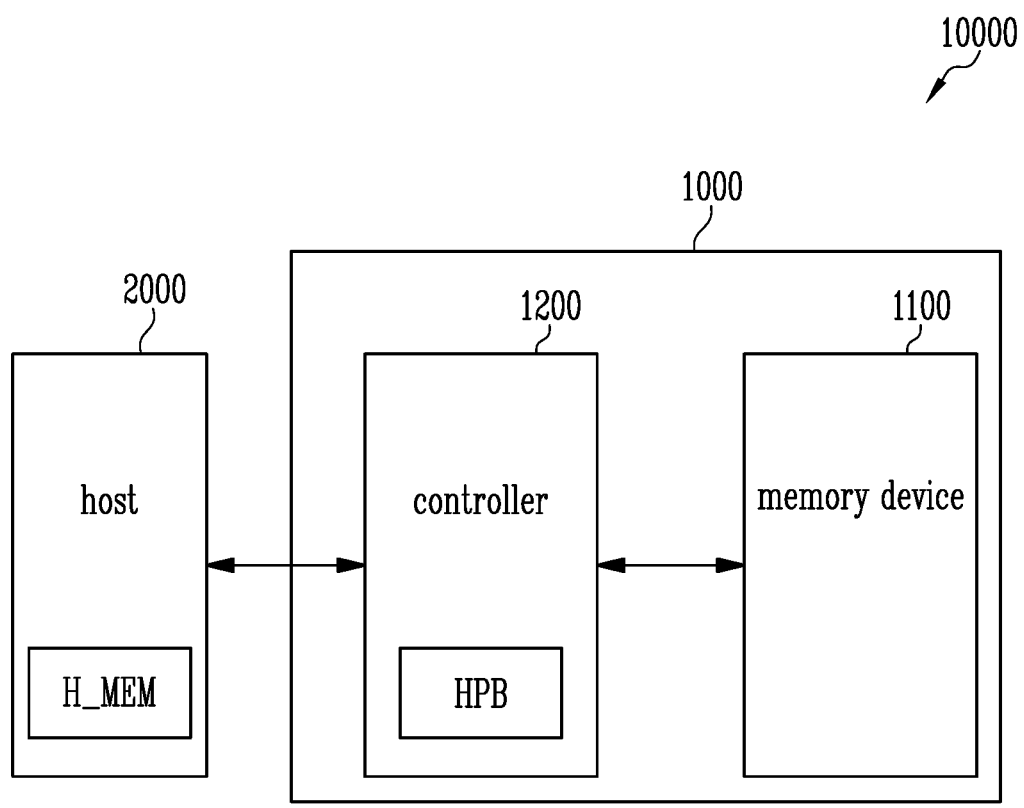
FIG. 1 is a diagram illustrating an electronic system in accordance with an embodiment of the present disclosure.

FIG. 1 is a diagram illustrating an electronic system in accordance with an embodiment of the present disclosure.

Referring to FIG. 1, the electronic system 10000 may include a memory system 1000 and a host 2000.

The memory system 1000 may include a memory device 1100 capable of storing data and a controller 1200 capable of controlling the memory device 1100. The memory device 1100 may be implemented as a volatile memory device or a nonvolatile memory device. In a volatile memory device stored data disappears when the supply of power is interrupted, and in a nonvolatile memory device stored data is retained even when the supply of power is interrupted. Examples of a volatile memory device include a dynamic random access memory (DRAM), a static random access memory (SRAM), etc., and the nonvolatile memory device may include a read only memory (ROM), a programmable read only memory (PROM), an erasable PROM (EPROM), an electrically EPROM (EEPROM), a NAND flash, etc.

The controller 1200 may control the memory device 1100 according to a request of the host 2000, and perform a background operation for improving the performance of the memory system 1000 even in the absence of a request of the host 2000. The controller 1200 may control the memory device 1100 by generating a command according to a request output from the host 2000 and transmitting the generated command to the memory device 1100.

The host 2000 may generate requests for various operations, and output the generated requests to the memory system 1000. For example, the host 2000 may include a program request for requesting a program operation, a read request for requesting a read operation, an erase request for requesting an erase operation, and the like.

The controller 1200 may include a host performance booster HPB so as to enhance the performance of communication with the host 2000.

The host performance booster HPB may store address mapping information obtained by mapping a logical address used in the host 2000 and a physical address used in the memory device 1100, and encode the mapping information and then output the mapping information to the host 2000.

The host 2000 may include a host memory H_MEM which stores mapping information output from the controller 1200 and outputting the mapping information together with a request to the controller 1200, if necessary.

As described above, when the host 2000 is to store mapping information of the memory system 1000, an operation time during which the controller 1200 searches for an address in a read operation can be reduced. For example, in the read operation, the host 2000 may output, to the memory system 1000, a read request and mapping information necessary for the read request. The controller 1200 included in the memory system 1000 may generate a read command according to the request output from the host 2000 and then output the read command to the memory device 1100, and output a physical address included in the mapping information output from the host 2000 to the memory device 1100.

The controller 1200 may output the mapping information to the host 2000. However, the controller 1200 does not output the mapping information in original form but may encode and output the mapping information. Also, the controller 1200 may output, to the host 2000, various system information including time information at which the mapping information is generated, in addition to the mapping information. Before the controller 1200 outputs data corresponding to the various information to the host 2000, the controller 1200 may perform an operation of encoding data, and output the encoded data to the host 2000.

However, since the host 2000 cannot recover the original version of the encoded data, the information received from the controller 1200 cannot be used in the host 2000.

In an embodiment, the controller 1200 may selectively encode some data among data to be output. Therefore, the controller 1200 may output a portion of the data in original form, and output another portion of data as encoded data. Accordingly, the host 2000 may use the original data among the received data therein.

In addition, when the host 2000 outputs the encoded data and the original data to the controller 1200, the controller 1200 may recover the encoded data as the original data.

A detailed encoding operation performed on some data in accordance with an embodiment is described below.

Figure 2:
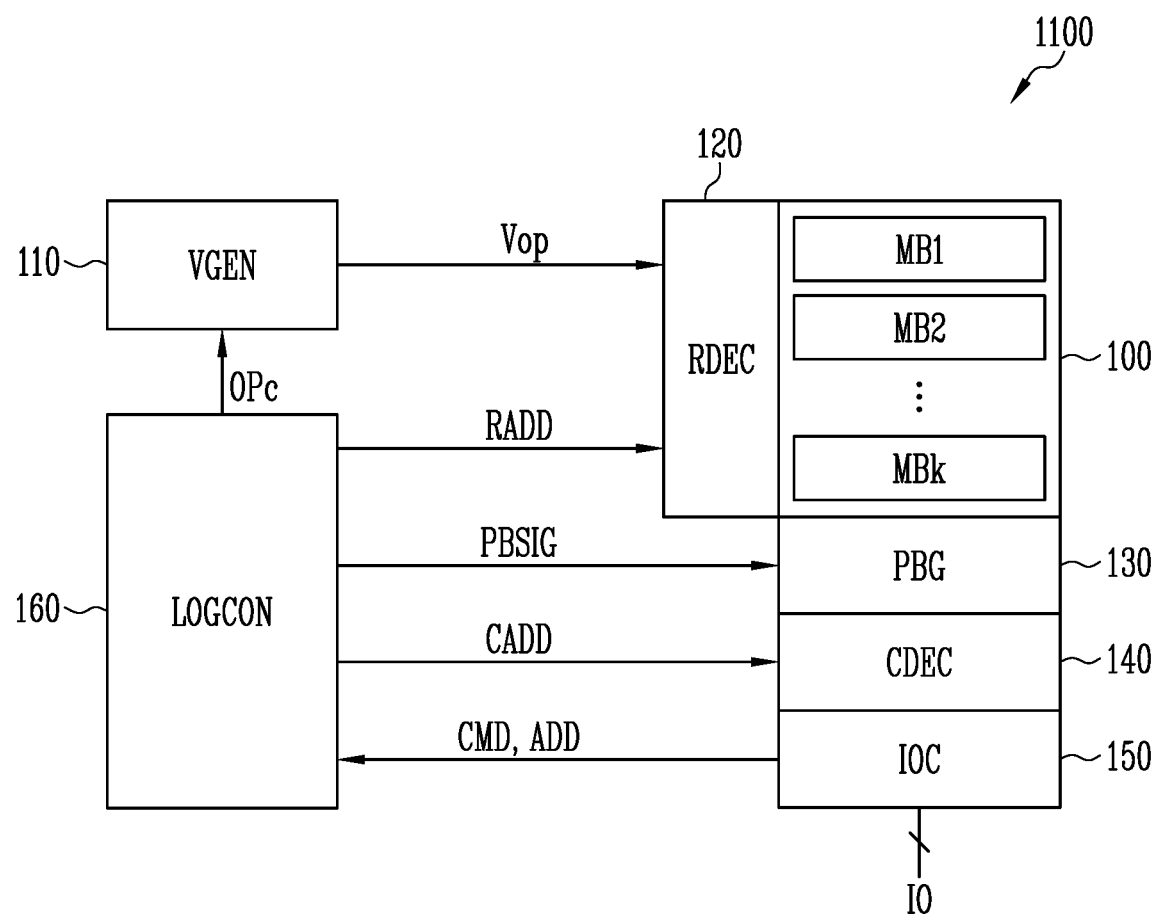
FIG. 2 is a diagram illustrating a memory device.

FIG. 2 is a diagram illustrating the memory device.

Referring to FIG. 2, the memory device 1100 may include a memory cell array configured to store data, peripheral circuits 110 to 150 configured to perform a program, read or erase operation, and a logic circuit LOGCON 160 configured to control the peripheral circuits 110 to 150.

The memory cell array 100 may include a plurality of memory blocks MB1 to MBk (k is a positive integer) for storing data. Each of the memory blocks MB1 to MBk may include a plurality of memory cells, and the memory cells may be implemented in a two-dimensional structure in which the memory cells are arranged in parallel to a substrate or a three-dimensional structure in which the memory cells are stacked in a direction vertical to a substrate. The memory cells may be coupled to a plurality of word lines, and a group of memory cells coupled to the same word line is a page. Different physical addresses may be allocated to the memory blocks MB1 to MBk, and physical addresses may be allocated to a plurality of pages included in a memory block. For example, an address allocated to a memory block may be a physical block address, and an address allocated to a page may be a physical page address.

The peripheral circuits 110 to 150 may include a voltage generator VGEN 110, a row decoder RDEC 120, a page buffer group PBG 130, a column decoder CDEC 140, and an input/output circuit IOC 150.

The voltage generator 110 may generate and output operating voltages Vop necessary for various operations in response to an operation code OPc. For example, the voltage generator 110 may generate and output a program voltage, a verify voltage, a read voltage, a pass voltage, an erase voltage, and the like.

The row decoder 120 may select one memory block among the memory blocks MB1 to MBk in the memory cell array 100 according to a row address RADD, and transmit operating voltages Vop to the selected memory block.

The page buffer group 130 may be coupled to the memory cell array 100 through bit lines. For example, the page buffer group 130 may include page buffers coupled to the respective bit lines. The page buffers may simultaneously operate in response to page buffer control signals PBSIG, and temporarily store data in a program or read operation. To this end, each of the page buffers may include a plurality of latches for temporarily storing data. A number of the latches may be changed depending on a program scheme. For example, the page buffers may be differently designed according to a number of bits to be stored in one memory cell. The page buffers may be differently designed depending on a number of verify voltages used in a verify operation.

The column decoder 140 may sequentially transmit data between the input/output circuit 150 and the page buffer group 130 according to a column address CADD.

The input/output circuit 150 may be coupled to the controller 1200 through input/output lines JO. The input/output circuit 150 may input or output a command CMD, an address ADD, and data through the input/output lines JO. For example, the input/output circuit 150 may transmit the command CMD and the address ADD, which are received through the input/output lines JO, to the logic circuit 160, and transmit the data received through the input/output lines JO to the page buffer group 130. The input/output circuit 150 may output data received from the page buffer group 130 to the controller (1200 shown in FIG. 1) through the input/output lines IO.

The logic circuit 160 may output the operation code OPc, the row address RADD, the page buffer control signals PBSIG, and the column address CADD in response to the command CMD and the address ADD. For example, the logic circuit 160 may include software such as an algorithm executed according to the command CMD, and include hardware for outputting various codes or signals according to the algorithm.

Figure 3:
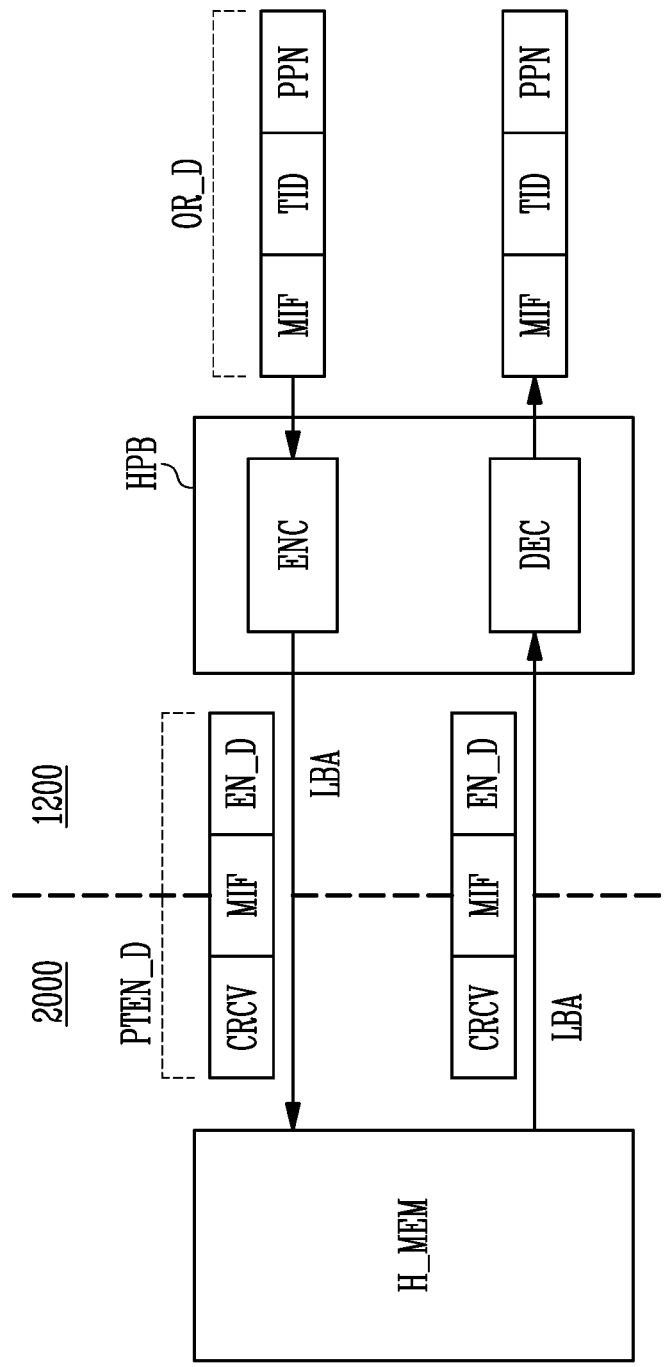
FIG. 3 is a diagram illustrating data which a controller and a host communicate in accordance with an embodiment of the present disclosure.
Figure 4:
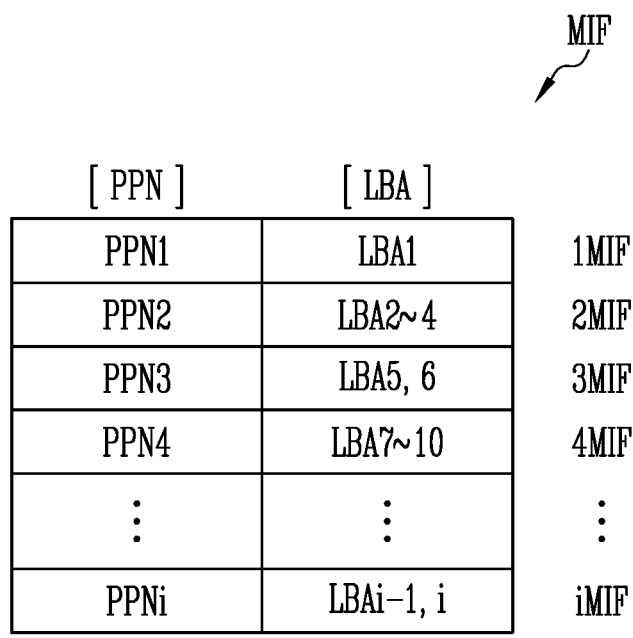
FIG. 4 is a diagram illustrating mapping information.

FIG. 3 is a diagram illustrating data which the controller and the host communicate in accordance with an embodiment of the present disclosure. FIG. 4 is a diagram illustrating mapping information.

Referring to FIG. 3, the host performance booster HPB included in the controller 1200 may generate partially encoded data PTEN_D by encoding a portion, i.e., some, of original data OR_D, and output the partially encoded data PTEN_D to the host 2000. The host 2000 may store the partially encoded data PTEN_D output from the controller 1200 to the host memory H_MEM.

The original data OR_D may include mapping information MIF on addresses, mapping time data TID, and a physical page number PPN. The mapping information MIF may represent a number of consecutive logical block addresses LAB, based on the physical page number PPN. The mapping time data TID may represent a time at which the mapping information MIF is generated. The physical page number PPN may be an address of an area in which data is stored in a program operation. For example, when the host 2000 transmits a program request together with data to the controller 1200, the controller 1200 may select one memory block among the memory blocks included in the memory device 1100, and program the data in a plurality of pages of the selected memory block. Therefore, the physical page number PPN may include addresses of a memory block and a page, in which data is stored. A logical block address LBA corresponds to the physical page number PPN of the area in which the data is stored, and may be an address used in the host 2000.

Referring to FIG. 4, when a first logic block address LBA1 is mapped to a first physical page number PPN1, first mapping information 1MIF of the first physical page number PPN1 may become 1, representing the number of logical block addresses. When second to fourth logical block addresses LBA2 to LBA4 are mapped to a second physical page number PPN2, second mapping information 2MIF of the second physical page number PPN2 may become 3, representing the number of logical block addresses. In this manner, when first to ith physical page numbers PPN1 to PPNi are generated, first to ith mapping information 1MIF to iMIF respectively corresponding to the first to ith physical page numbers PPN1 to PPNi may be generated.

Referring to FIG. 3, when the program operation requested by the host 2000 is completed, the controller 1200 may transmit, to the host 2000, a physical page number PPN at which data is programmed and a logical block address LBA mapped to the physical page number PPN. The controller 1200 may transmit, to the host 2000, various information related to mapping in addition to the mapped address.

In an embodiment, the controller 1200 transmits the mapping information MIF, the mapping time data TID, the physical page number PPN, and the logical block address LBA to the host 2000. However, the controller 1200 may transmit various data to the host 2000 in addition to the mapping information MIF, the mapping time data TID, the physical page number PPN, and the logical block address LBA. Since the logical block address LBA is data used in the host 2000, the controller 1200 does not encode the logical block address LBA but outputs the logical block address LBA as is. Since the mapping information MIF, the mapping time data TID, and the physical page number PPN are data used in the controller 1200, the controller 1200 may encode the mapping information MIF, the mapping time data TID, and the physical page number PPN, and output the mapping information MIF, the mapping time data TID, and the physical page number PPN to host 2000. However, the host 2000 may use some data among the data. Therefore, the controller 1200 in accordance with an embodiment may encode only some data in the original data OR_D including the mapping information MIF, the mapping time data TID, and the physical page number PPN, and output the remaining data in its original form to the host 2000.

For example, when the controller 1200 selectively encodes the mapping time data TID and the physical page number PPN in the original data OR_D and outputs the mapping information MIF maintained in original form to the host 2000, the controller 1200 may output partially encoded data PTEN_D representing some of the original data OR_D by performing a partial encoding operation.

The partially encoded data PTEN_D may include a cyclic redundancy check value CRCV, mapping information MIF, and encoded data EN_D. The encoded data EN_D may be data in which the mapping time data TID and the physical page number PPN are encoded. When the controller 1200 outputs the partially encoded data PTEN_D to the host 2000 by encoding some of the original data OR_D, the controller 1200 may also output, to the host 2000, a logical block address LBA corresponding to the physical page number PPN.

When the host 2000 outputs a read request to the controller 1200 so as to perform a read operation of the logical block address LBA, the host 2000 may output, to the controller 1200, partially encoded data PTEN_D corresponding to the logical block address LBA and the logical block address LBA. The controller 1200 may recover, as the original data OR_D, the partially encoded data PTEN_D output from the host 2000 by decoding the partially encoded data PTEN_D.

In order to perform the above-described partial encoding operation, the host performance booster HPB of the controller 1200 may include an encoder ENC and a decoder DEC. The encoder ENC may encode some of the original data OR_D to generate partially encoded data PTEN_D, and the decoder DEC may recover the original data OR_D by decoding the partially encoded data PTEN_D.

The encoder ENC and the decoder DEC, which are shown in FIG. 3, will be described in detail as follows.

Figure 5:
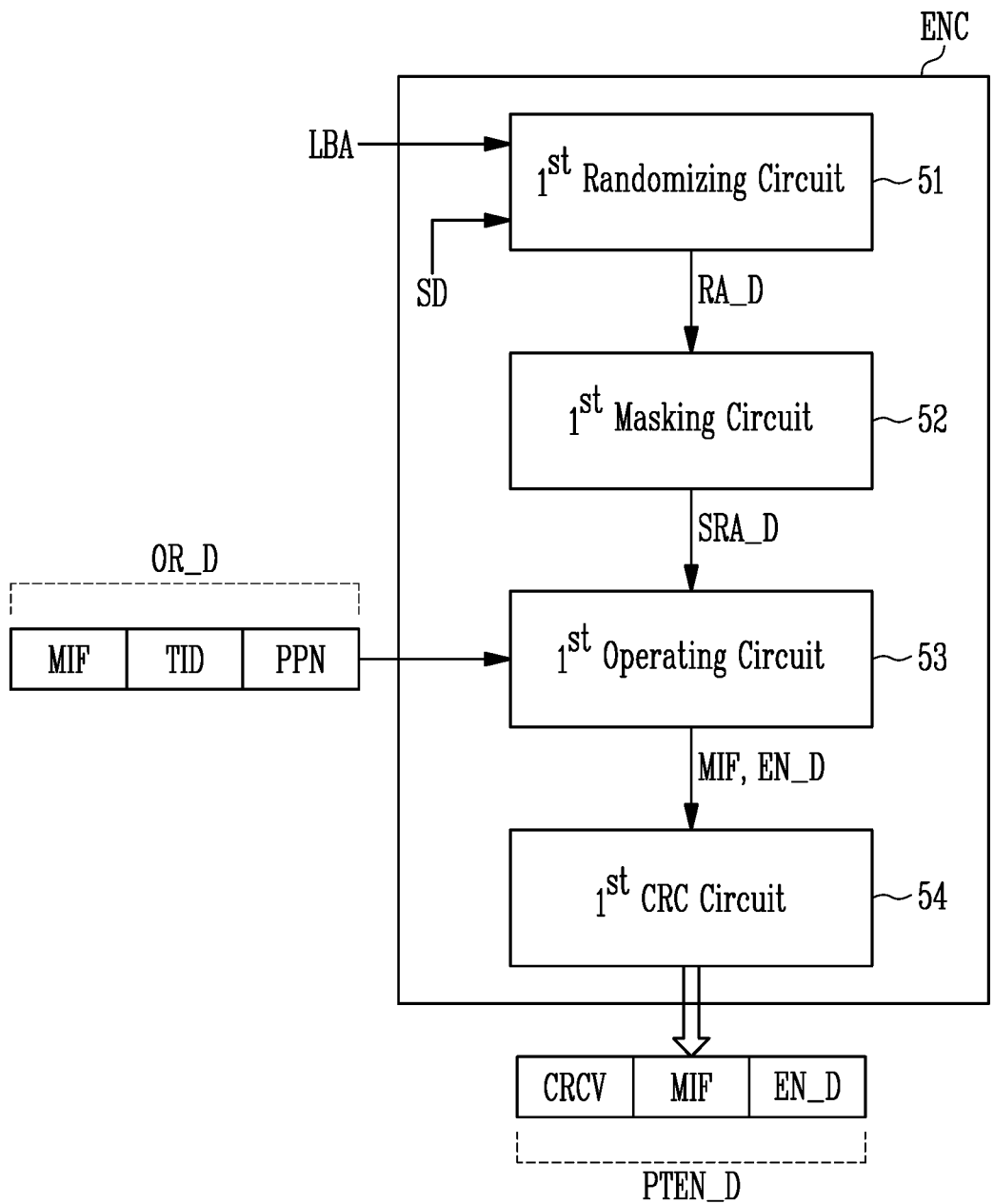
FIG. 5 is a diagram illustrating in detail an encoder in accordance with an embodiment of the present disclosure.

FIG. 5 is a diagram illustrating in detail an encoder in accordance with an embodiment of the present disclosure.

Referring to FIG. 5, the encoder ENC capable of performing a partial encoding operation may include a first randomizing circuit 51, a first masking circuit 52, a first operating circuit 53, and a first cyclic redundancy check (CRC) circuit 54.

The first randomizing circuit 51 may generate random data RA_D by randomizing a logical block address mapped to a physical page number PPN according to seed data SD.

The first masking circuit 52 may extract select random data SRA_D on which an encoding operation is to be performed among the random data RA_D. For example, the first masking circuit 52 may extract select random data SRA_D having a number of bits equal to that of data on which the encoding operation is to be performed.

The first operating circuit 53 may output data in which only a portion corresponding to the select random data SRA_D is encoded by perform an operation on original data OR_D and the select random data SRA_D. For example, when the select random data SRA_D corresponds to mapping time data TID and a physical page number PPN, the first operating circuit 53 may output encoded data EN_D by performing an XOR operation on the mapping time data TID and the physical page number PPN, and the select random data SRA_D. Since mapping information MIF which does not correspond to the select random data SRA_D in the original data OR_D has no object on which the XOR operation is to be performed therewith, the mapping information may be output in its original form from the first operating circuit 53.

The first CRC circuit 54 may perform a cyclic redundancy check on the mapping information MIF and the encoded data EN_D, which are output from the first operating circuit 53, and output partially encoded data PTEN_D including a cyclic redundancy check value CRCV generated in the cyclic redundancy check. For example, the partially encoded data PTEN_D may include the cyclic redundancy check value CRCV, the mapping information MIF, and the encoded data EN_D.

Figure 6:
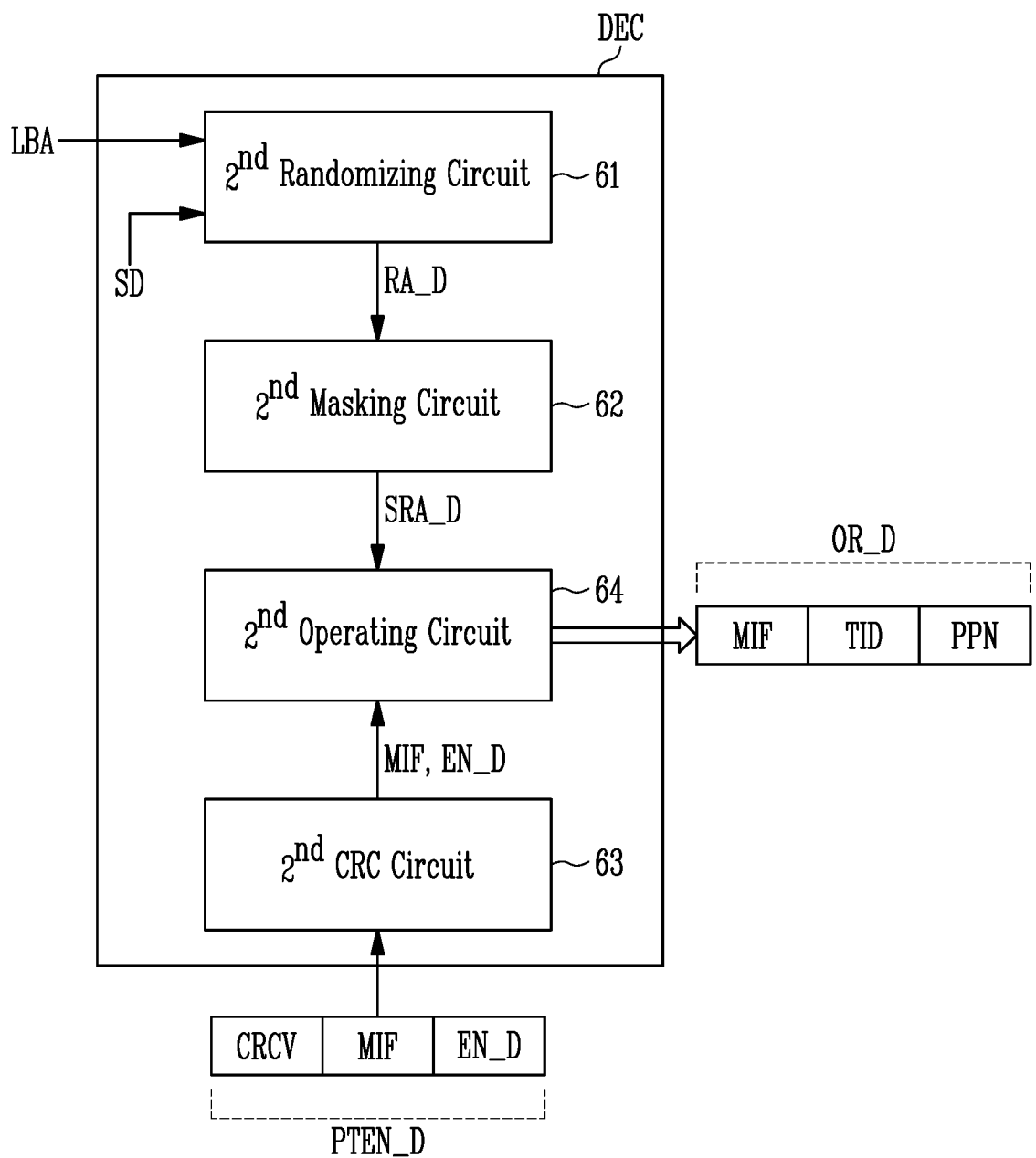
FIG. 6 is a diagram illustrating in detail a decoder in accordance with an embodiment of the present disclosure.

FIG. 6 is a diagram illustrating in detail a decoder in accordance with an embodiment of the present disclosure.

Referring to FIG. 6, the decoder DEC capable of recovering encoded data may include a second randomizing circuit 61, a second masking circuit 62, a second CRC circuit 63, and a second operating circuit 64.

The second randomizing circuit 61 may generate random data RA_D by randomizing a logical block address LBA output from the host (2000 shown in FIG. 3) according to seed data SD. The seed data SD used in the second randomizing circuit 61 may be to the same as the seed data SD used in the encoder (ENC shown in FIG. 5). For example, when the seed data SD is changed since a logical block address LBA at which a randomizing operation is performed in the encoder ENC is changed, the second randomizing circuit 61 may also use seed data SD corresponding to the changed logical block address LBA.

The second masking circuit 62 may extract select random data SRA_D on which a recovery operation is to be performed in the random data RA_D. For example, the second masking circuit 62 may extract select random data SRA_D having a number of bits equal to that of data on which the recovery operation is to be performed. For example, the second masking circuit 62 may extract select random data SRA_D having a number of bits equal to that set in the first masking circuit (52 shown in FIG. 5), and extract select random data SRA_D equal to that (SRA_D shown in FIG. 5) extracted in the first masking circuit 52.

The second CRC circuit 63 may check for error(s) in partially encoded data PTEN_D output from the host 2000 by using a cyclic redundancy check value CRCV included in the partially encoded data PTEN_D, and output mapping information MIF and encoded data EN_D, which are included in the partially encoded data PTEN_D when no error exists. When an error is detected in the partially encoded data PTEN_D, the second CRC circuit 63 may request the host 2000 to re-transmit the partially encoded data PTEN_D.

The second operating circuit 64 may recover mapping time data TID and a physical page number PPN as original data of the encoded data EN_D by performing an operation on the mapping information MIF and the encoded data EN_D, and the select random data SRA_D. For example, the second operating circuit 64 may recover the mapping time data TID and the physical page number PPN by performing an XOR operation on the encoded data EN_D and the select random data SRA_D. The mapping information MIF which does not correspond to the select random data SRA_D may be output in original form from the second operating circuit 64. Therefore, the second operating circuit 64 may output original data OR_D including the mapping data MIF, the mapping time data TID, and the physical page number PPN.

The partial encoding operation performed in the encoder ENC shown in FIG. 5 and the recovery operation performed in the decoder DEC shown in FIG. 6 are described in detail below.

Figure 7A:
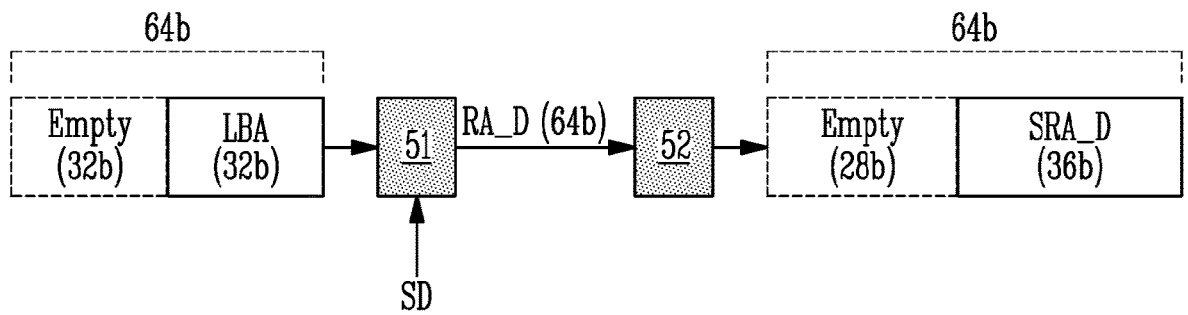
FIGS. 7A to 7C are diagrams illustrating an encoding operation in accordance with an embodiment of the present disclosure.
Figure 7B:
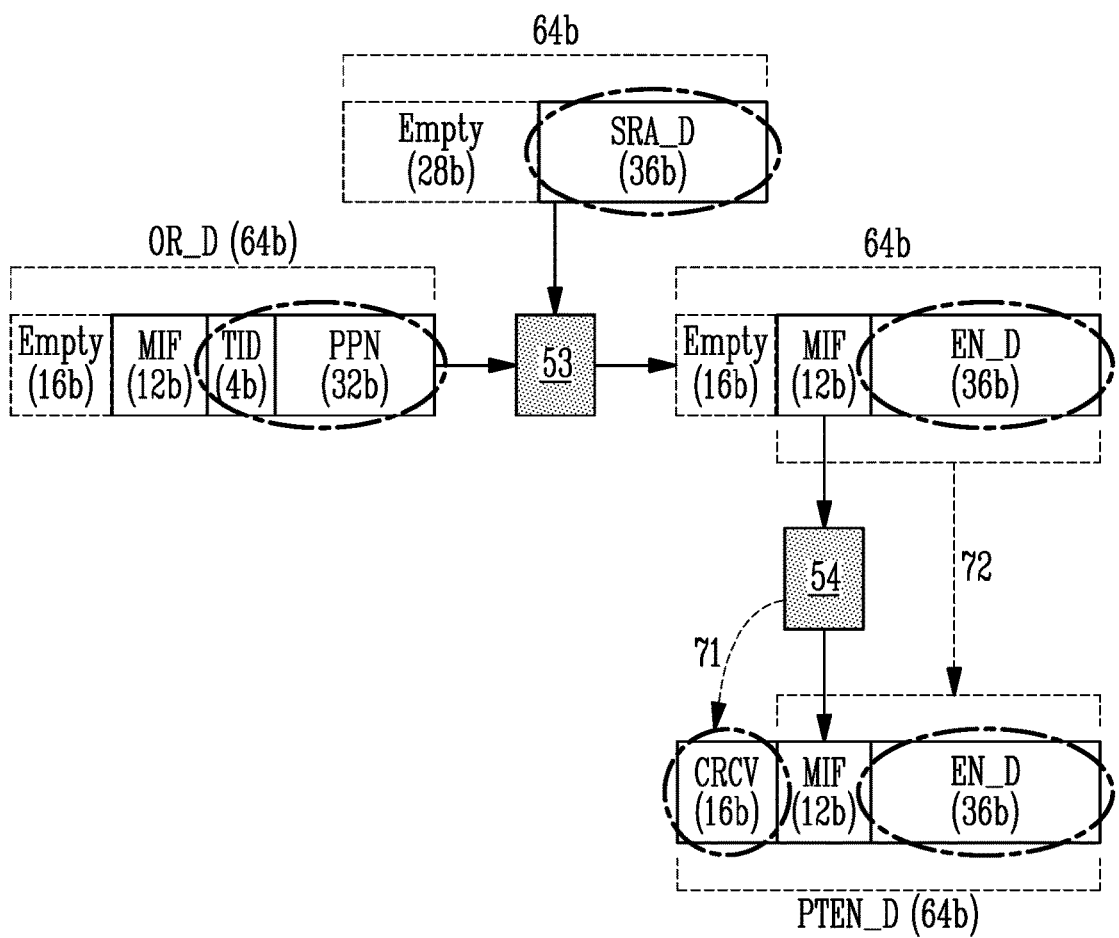
Figure 7C:
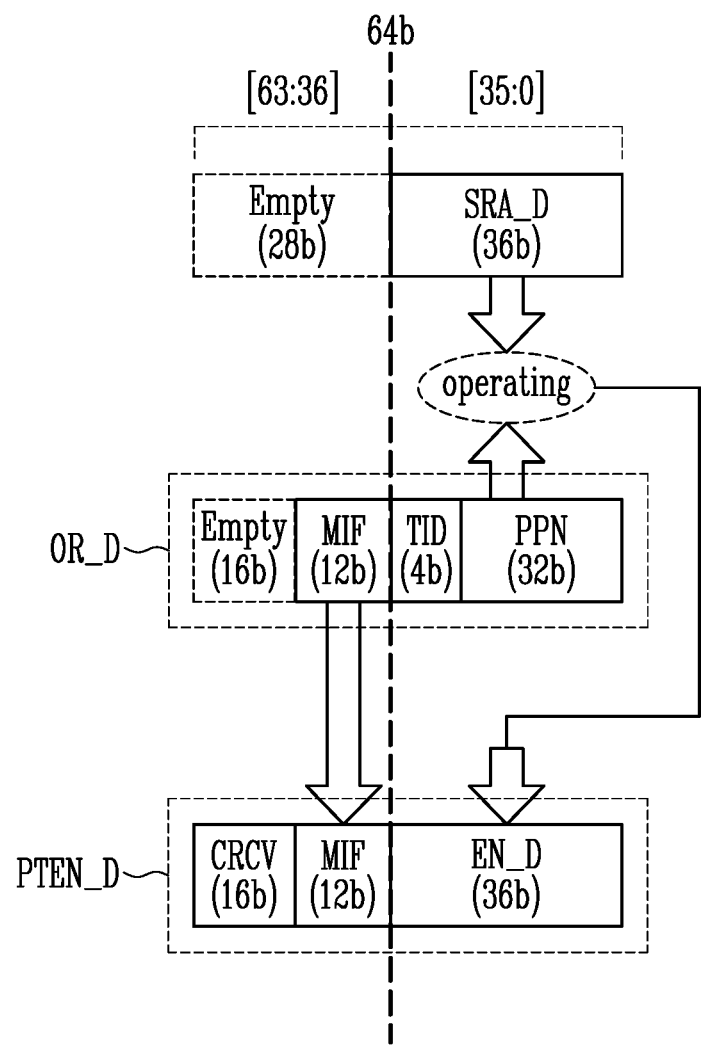

FIGS. 7A to 7C are diagrams illustrating a partial encoding operation in accordance with an embodiment of the present disclosure.

Referring to FIG. 7A, the first randomizing circuit 51 may randomize a logic block address LBA mapped to a physical page number PPN by using seed data SD, and output random data RA_D as a result of the randomization. Data input to the first randomizing circuit 51 may be input according to a set bit number, representing the number of bits of data. For example, when data of 64 bits is set to be input to the first randomizing circuit 51, a memory area in which the other bits, except the logical block address LBA among 64 bits (64*b*), may be stored is empty. For example, when the logical block address LBA corresponds to 32 bits (32*b*), a memory area corresponding to the other 32 bits (32*b*) may be maintained in an empty state.

The first randomizing circuit 51 may randomize input data of 64 bits (64*b*) by using the seed data SD, and output random data of 64 bits (64*b*) as a result of the randomization.

The first masking circuit 52 may extract select random data SRA_D on which an encoding operation is to be performed among the random data RA_D of 64 bits (64*b*). For example, an encoding bit number representing the number of bits of data on which the encoding operation is to be performed, may be set in the first masking circuit 52, and the first masking circuit 52 may extract the select random data SRA_D by selecting data corresponding to the encoding bit number among the random data RA_D. For example, when the encoding bit is set to 36 bits (36*b*), the first masking circuit 52 may extract, as the select random data SRA_D, data corresponding to 36 bits (36*b*), among the random data RA_D of 64 bits (64*b*), and a memory area for the other 28 bits (28*b*) is empty.

Referring to FIG. 7B, the first operating circuit 53 may output data in which only data corresponding to select random data SRA_D of 36 bits (36*b*) is encoded by performing an operation on original data OR_D and data of 64 bits (64*b*), which includes the select random data SRA_D. For example, the first operating circuit 53 may output data of 64 bits (64*b*) by performing an operation on data groups of 64 bits (64*b*). For example, when mapping information MIF corresponds to 12 bits (12*b*), mapping time data TID corresponds to 4 bits (4*b*), and a physical page number PPN corresponds to 32 bits (32*b*), data of 16 bits (16*b*) may remain among original data input to the first operating circuit 53, and no data is added to the remaining 16 bits (16*b*).

Since the select random data SRA_D corresponds to 36 bits (36*b*), the first operating circuit 53 may generate encoded data EN_D of 36 bits (36*b*) by performing an XOR operation on the mapping time data TID and the physical page number PPN, which correspond to 36 bits (36*b*), and the select random data SRA_D. To this end, the first operating circuit 53 may perform an XOR operation sequentially on input data. When the operation on the select random data, and the mapping time data TID and the physical page number PPN ends, the first operating circuit 53 may output the mapping information MIF consecutively to the encoded data EN_D since no data on which an operation is to be performed with the mapping information MIF exists. Since the encoded data EN_D output from the first operating circuit 53 corresponds to 36 bits (36*b*) and the mapping information MIF corresponds to 12 bits (12*b*), an extra storage area for the other 16 bits (16*b*) may remain.

The first CRC circuit 54 may perform a cyclic redundancy check on the mapping information MIF and the encoded data EN_D, and allow a cyclic redundancy check value CRCV generated in the cyclic redundancy check to be included in the extra storage area. For example, the cyclic redundancy check value CRCV may be a value generated to check error(s) in data. The cyclic redundancy check value CRCV may be included in the extra storage area (71) to be output together with the mapping information MIF and the encoded data EN_D. Since the first CRC circuit 54 generates the cyclic redundancy check value CRCV according to the mapping information MIF and the encoded data EN_D, the mapping information MIF and the encoded data EN_D may be output as input original data (72).

Accordingly, the first CRC circuit 54 may output partially encoded data PTEN_D of 64 bits (64*b*), which includes the cyclic redundancy check value CRCV, the mapping information MIF, and the encoded data EN_D.

That is, the mapping information MIF among the mapping information MIF, the mapping time data TID, and the physical page number PPN, which are included in the original data OR_D, may be output as non-encoded original data, and only the mapping time data TID and the physical page number PPN may encoded and output.

The partially encoded data PTEN_D output from the first CRC circuit 54 may be transmitted to the host (2000 shown in FIG. 3). Since the mapping information MIF in the partially encoded data PTEN_D is maintained in its original form, the host 2000 may use the mapping data MIF in an operation which the host 2000 autonomously performs.

Referring to FIG. 7C, as shown in FIGS. 7A and 7B, a total capacity of data input to the first operating circuit 53 and data output from the first CRC circuit 54 may be continuously maintained as a fixed capacity. An operation may be performed sequentially on the input data according to an order in which the input data are input, and data generated as a result of the operation may be sequentially output.

For example, select random data SRA_D may be sequentially input to the first operating circuit 53 through a memory area or cache corresponding to 0 to 35 bits, and mapping time data TID and a physical page number PPN may be sequentially input to the first operating circuit 53 through a memory area or cache corresponding to 0 to 35 bits.

The first operating circuit 53 may perform an XOR operation sequentially on data corresponding to 0 to 35 bits, and sequentially output encoded data EN_D generated by the XOR operation.

After the operation is performed on the data corresponding to 0 to 35 bits, the other mapping information MIF corresponding to 36 to 63 bits may be sequentially input to the first operating circuit 53. However, since no data input consecutively to the select random data SRA_D exists, the first operating circuit 53 may output, in original form, the other mapping information MIF corresponding to 36 to 63 bits.

The first CRC circuit 54 may generate a cyclic redundancy check value CRCV according to the mapping information MIF and the encoded data EN_D. Therefore, the first CRC circuit 54 may output, to the host 2000, the cyclic redundancy check value CRCV, the mapping information MIF, and the encoded data EN_D, which are finally generated.

Figure 8:
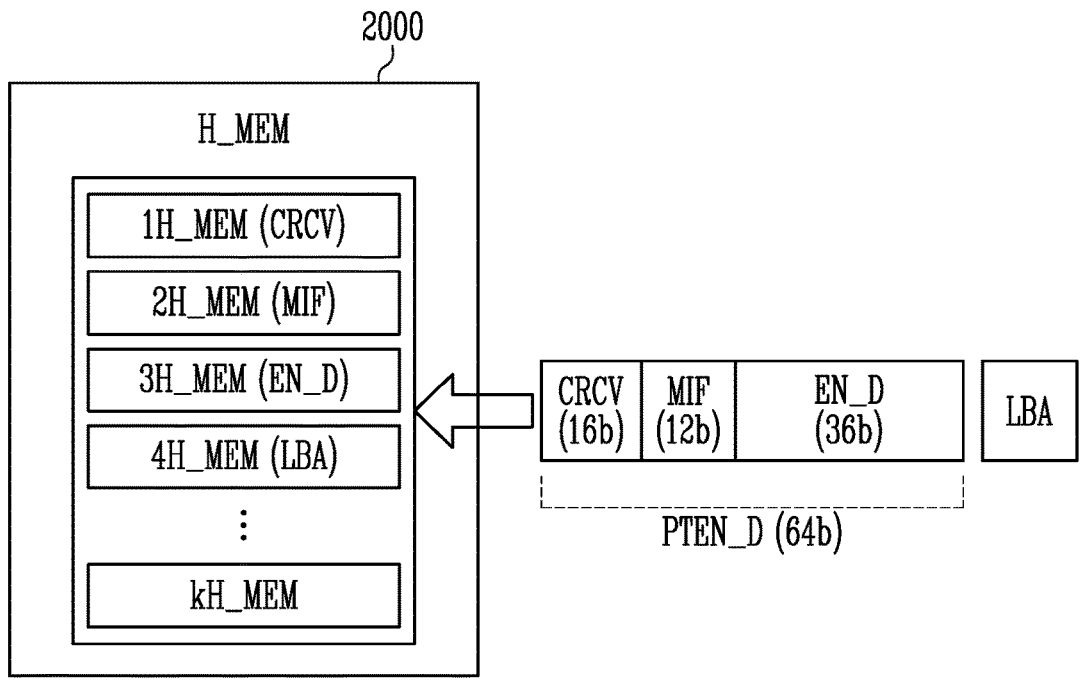
FIG. 8 is a diagram illustrating a host memory in accordance with an embodiment of the present disclosure.

FIG. 8 is a diagram illustrating a host memory in accordance with an embodiment of the present disclosure.

Referring to FIG. 8, the host 2000 may receive partially encoded data PTEN_D and a logical block address LBA, which are output from the memory system 1000, and store the partially encoded data PTEN_D and the logical block address LBA in the host memory H_MEM. For example, the host memory H_MEM may include first to kth memories 1H_MEM to kH_MEM (k is a positive integer), and a cyclic redundancy check value CRCV, mapping information MIF, encoded data EN_D, or a logical block address LBA may be stored in each memory. Data stored in the host memory H_MEM may be output when the host 2000 outputs a read request to the memory system 1000. Since the mapping information corresponding to original data is not encoded, the host 2000 may use the mapping information MIF in a necessary operation.

Figure 9A:
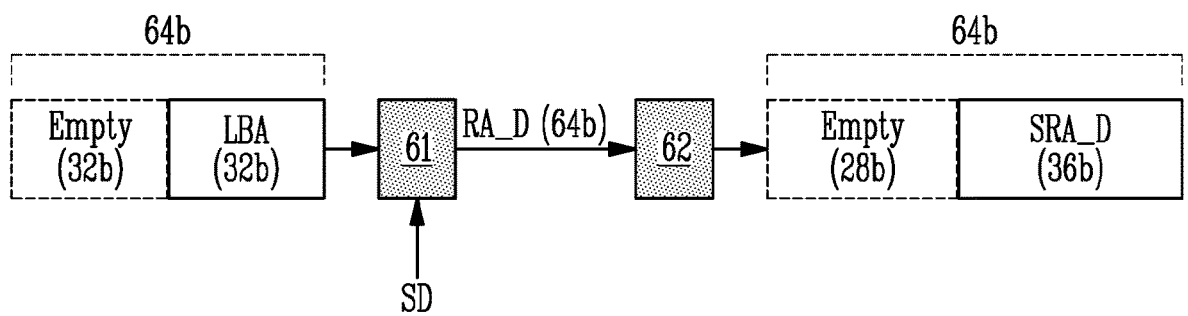
FIGS. 9A and 9B are diagrams illustrating a recovery operation in accordance with an embodiment of the present disclosure.
Figure 9B:
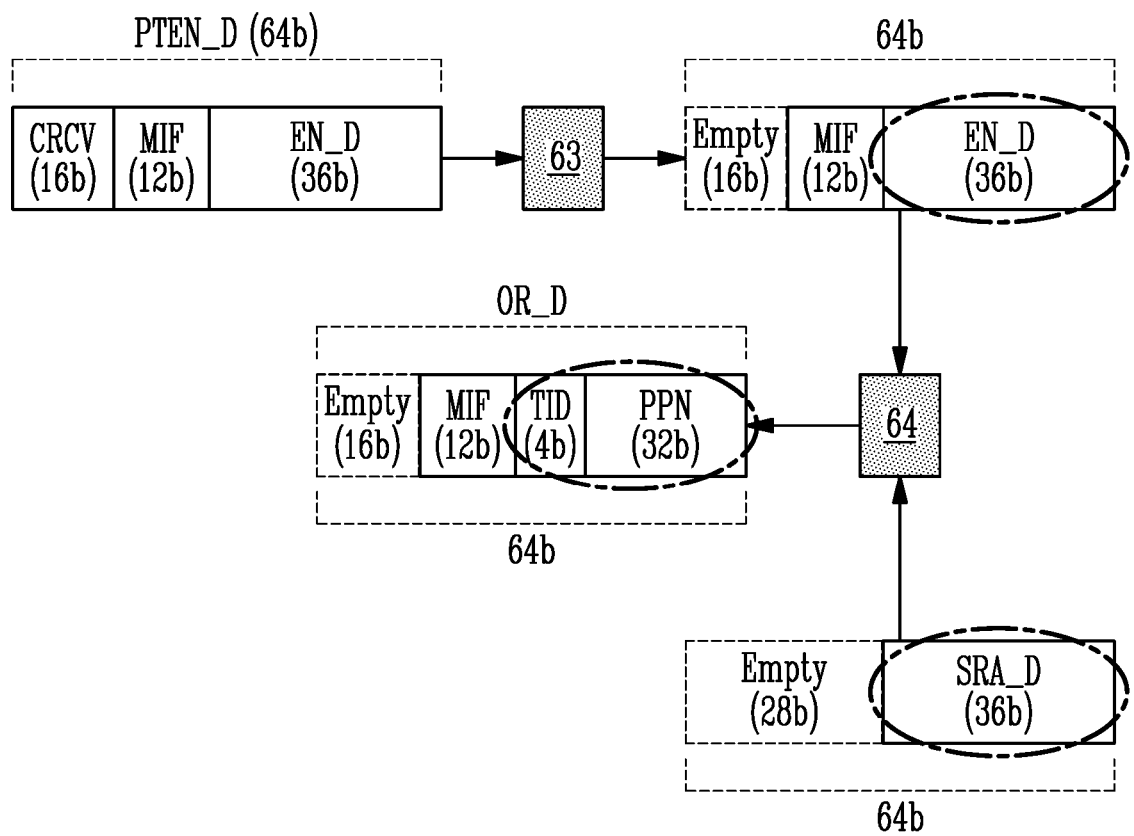

FIGS. 9A and 9B are diagrams illustrating a recovery operation in accordance with an embodiment of the present disclosure.

Referring to FIG. 9A, the second randomizing circuit 61 may randomize a logical block address LBA output from the host 2000 by using seed data SD, and output random data RA_D as a result of the randomization. Data input to the second randomizing circuit 61 may be input according to a set bit number. For example, when data of 64 bits (64*b*) is set to be input to the second randomizing circuit 61, a memory area in which the other bits, except the logical block address LBA, among 64 bits (64*b*) are to be stored may be maintained in the empty state. For example, when the logical block address LBA corresponds to 32 bits (32*b*), a memory area corresponding to the other 32 bits (32*b*) may be maintained in the empty state.

The second randomizing circuit 61 may randomize input data of 64 bits (64*b*) by using the seed data SD, and output random data RA_D of 64 bits (64*b*) as a result of the randomization.

The second masking circuit 62 may extract select random data SRA_D on which an encoding operation is to be performed in the random data of 64 bits (64*b*). For example, an encoding bit number equal to a bit number of data on which the encoding operation is to be performed may be set in the second masking circuit 62, and the second masking circuit 62 may extract the select random data SRA_D by selecting data corresponding to the encoding bit number among the random data RA_D. For example, when the encoding bit number is set to 36 bits (36*b*), the second masking circuit 62 may extract, as the select random data SRA_D, data corresponding to 36 bits (36*b*), among the random data RA_D of 64 bits (64*b*), and a memory area of the other 28 bits (28*b*) is maintained in the empty state.

Referring to FIG. 9B, the second CRC circuit 63 may receive partially encoded data PTEN_D output from the host 2000, and check or detect whether an error has occurred in mapping information MIF and encoded data EN_D, by using a cyclic redundancy check value CRCV included in the partially encoded data PTEN_D. When no error is detected in the mapping information MIF and the encoded data EN_D, the second CRC circuit 63 may remove the cyclic redundancy check value CRCV. When an error is detected in the mapping information MIF and the encoded data EN_D, the second CRC circuit 63 may request the host 2000 to re-transmit the partially encoded data PTEN_D.

The second operating circuit 64 may recover original data OR_D by performing an operation on the mapping information MIF and the encoded data EN_D, and data of 64 bits (64*b*), which includes select random data SRA_D. For example, the second operating circuit 64 may output data of 64 bits (64*b*) by performing an operation sequentially on input data groups of 64 bits (64*b*). For example, since the select random data SRA_D corresponds to 36 bits (36*b*), an XOR operation may be performed sequentially on the encoded data EN_D and the select random data SRA_D according to an order in which the input data are input in the mapping information MIF and the encoded data EN_D, which are output from the second CRC circuit 63. When the XOR operation is performed on the encoded data EN_D with the select random data SRA_D, mapping time data TID and a physical page number PPN, which are original data, may be recovered.

When the operation on the select random data SRA_D and the encoded data EN_D ends, the second operating circuit 64 may output the mapping information as is since no data on which an operation is to be performed with the mapping information MIF exists. Accordingly, the second operating circuit 64 may output the original data OR_D including the mapping information MIF, the mapping time data TID, and the physical page number PPN.

The controller 1200 may generate a read command according to a read request output from the host 2000, and output, to the memory device (1100 shown in FIG. 1), the physical page number PPN included in the output original data OR_D together with the read command. The memory device 1100 may perform a read operation in response to the read command and the physical page number PPN.

Figure 10:
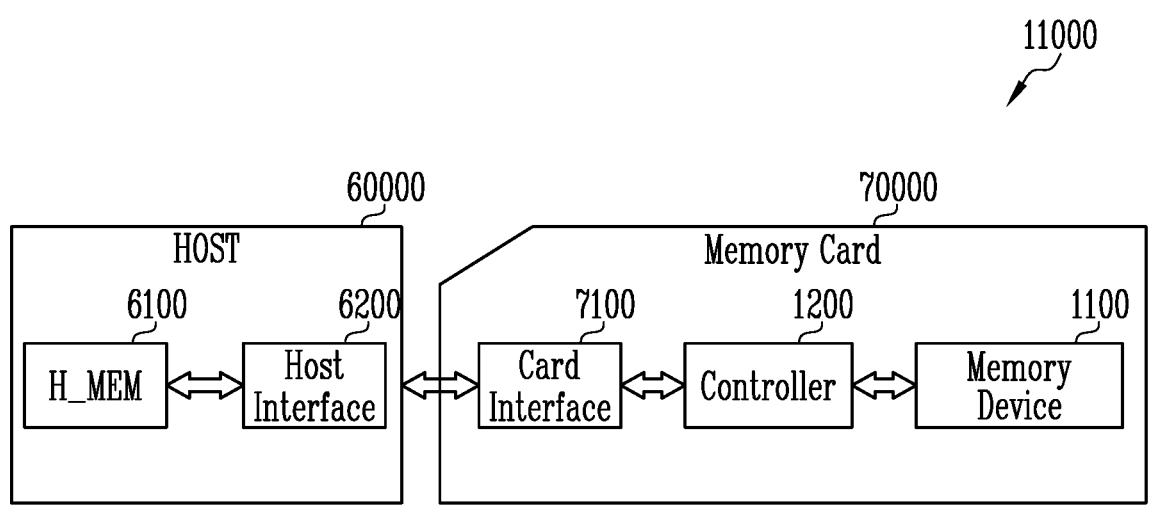
FIG. 10 is a diagram illustrating an electronic system in accordance with another embodiment of the present disclosure.

FIG. 10 is a diagram illustrating an electronic system in accordance with another embodiment of the present disclosure.

Referring to FIG. 10, the electronic system 11000 may include a memory card 70000 and a host 60000. The memory card 70000 may include a memory device 1100, a controller 1200, and a card interface 7100.

The memory device 1100 may be configured as the memory device 1100 described with reference to FIG. 2.

The controller 1200 may control data exchange between the memory device 1100 and the card interface 7100. In accordance with embodiments, the controller 1200 may output partially encoded data by selectively encoding only a portion of original data, and recover the partially encoded data as the original data.

The card interface 7100 may be a secure digital (SD) card interface or a multi-media card (MMC) interface, but the present invention is not limited thereto.

The card interface 7100 may interface data exchange between the host 60000 and the controller 1200 according to a protocol of the host 60000, and include the host memory H_MEM described with reference to FIG. 8. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory card 70000 is connected to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the controller 1200.

The host 60000 may include a host memory (H_MEM) 6100. In accordance with embodiments, the host 60000 may store partially encoded data output from the memory card 70000, and output a read request for a read operation together with the partially encoded data when the host 60000 outputs the read request.

In accordance with embodiments, when the controller outputs encoded data to the host, the controller can output partially encoded data obtained by selectively encoding only a portion of original data. Thus, the host can extract the original data from the received partially encoded data and use the original data.

While the present disclosure has been shown and described with reference to certain embodiments thereof, it will be understood by those skilled in the art that various changes in form and details may be made therein without departing from the spirit and scope of the present invention as defined by the appended claims and their equivalents. Therefore, the scope of the present invention should not be limited to the above-described embodiments but should be determined by the appended claims including equivalents thereof.

In the above-described embodiments, not all steps, or all parts of steps, need be performed in all embodiments. Moreover, the steps do not necessarily need to be performed in the described order. The embodiments disclosed herein are only examples to facilitate an understanding of the present invention, not to limit it. That is, it should be apparent to those skilled in the art that various modifications can be made on the basis of the technological scope of the present disclosure.

Also, although specific terminologies are used here, they are only used to explain the embodiments of the present disclosure. Therefore, the present invention is not limited by any of these terms nor by any other detail of the above-described embodiments, as many variations are possible within the spirit and scope of the present invention. It should be apparent to those skilled in the art that various modifications can be made to any of the disclosed embodiments on the basis of the technological scope of the present disclosure.

What is claimed is:

1. A controller comprising:
a randomizing circuit configured to generate random data having a set number of bits;
a masking circuit configured to output select random data to an operating circuit by extracting data corresponding to the set number of bits on which a partial encoding operation is to be performed, among the random data received from the randomizing circuit;
the operating circuit configured to receive original data and the select random data, wherein the original data includes first original data and second original data, generate encoded data by performing an operation on the second original data and the select random data, and output the encoded data and the first original data to a cyclic redundancy check circuit, wherein the second original data is changed to the encoded data; and
the cyclic redundancy check circuit configured to generate a cyclic redundancy check value by performing a cyclic redundancy check on the encoded data and the first original data, and output partially encoded data including the cyclic redundancy check value, the first original data, and the encoded data.

2. The controller of claim 1, wherein the randomizing circuit, the masking circuit, the operating circuit, and the cyclic redundancy check circuit input and output data having the same number of bits.

3. The controller of claim 1, wherein the randomizing circuit generates the random data by performing a randomizing operation using a logical address and seed data.

4. The controller of claim 1, wherein the masking circuit outputs the select random data by extracting data in an order in which the random data are input, according to the set number of bits on which the partial encoding operation is to be performed.

5. The controller of claim 1, wherein, among the second original data, data respectively corresponding to the set number of bits of the select random data are selectively encoded to be output as the encoded data.

6. The controller of claim 1, wherein the operating circuit:
outputs the encoded data by performing an XOR operation on the select random data and the second original data, which are sequentially input; and
outputs the first original data.

7. The controller of claim 1, wherein the cyclic redundancy check circuit generates the cyclic redundancy check value for checking an error of the encoded data and the first original data, and outputs the partially encoded data including the cyclic redundancy check value to a host.

8. A controller comprising:
a first randomizing circuit configured to generate random data having a set number of bits;
a first masking circuit configured to output select random data to a first operating circuit by extracting data corresponding to the set number of bits on which a partial encoding operation is to be performed, among the random data received from the first randomizing circuit;
the first operating circuit configured to receive original data and the select random data, wherein the original data includes first original data and second original data, generate encoded data by performing an operation on the second original data and the select random data, and output the encoded data and the first original data to a first cyclic redundancy check circuit, wherein the second original data is changed to the encoded data;
the first cyclic redundancy check circuit configured to generate a cyclic redundancy check value by performing a cyclic redundancy check on the encoded data and the first original data, and output partially encoded data including the cyclic redundancy check value, the first original data, and the encoded data;
a second randomizing circuit configured to generate random data having a number of bits equal to or greater than that of the select random data;
a second masking circuit configured to output the select random data to a second operating circuit by extracting a portion of the random data;
a second cyclic redundancy check circuit configured to perform an error check of the encoded data, output the first original data to the second operating circuit from which an error check value included in the encoded data is removed when no error is detected, and request a host to re-transmit the encoded data when an error is detected; and the second operating circuit configured to recover the second original data by performing an XOR operation on the encoded data and the select random data.

9. The controller of claim 8, wherein the first original data includes mapping information on a physical page number and a logical block address, and the second original data includes mapping time data representing a time at which the mapping information is generated and a physical page number including a memory block address and a page address in which data are stored.

10. A method for operating a controller, the method comprising:

generating random data having first to Ath bits using a randomizing circuit;

extracting, using a masking circuit, select random data corresponding to first to Bth bits among the random data received from the randomizing circuit, and maintaining, as an empty area, a memory area corresponding to (B+1)th to Ath bits, wherein A and B are positive integers;

generating, using an operating circuit, encoded data having the first to Bth bits by performing an operation on original data having the first to Ath bits and the select random data received from the masking circuit, wherein the original data includes first original data and second original data, and the second original data and the select random data are operated so that the second original data is changed to the encoded data; and outputting, using the operating circuit, the encoded data and the first original data corresponding to the (B+1)th to Ath bits among the original data.

11. The method of claim 10, wherein the encoded data are generated by performing an XOR operation on the second original data and the select random data.

12. The method of claim 10, wherein the first original data corresponding to (B+1)th to Cth bits among the original data are valid data, and a memory area corresponding to (C+1)th to Ath bits is an empty area, wherein C is positive integer.

13. The method of claim 12, further comprising:

after outputting the first original data and the encoded data, generating a cyclic redundancy check value having the (C+1)th to Ath bits and allowing the cyclic redundancy check value to be included in the memory area corresponding to the (C+1)th to Ath bits so as to check an error of the first original data and the encoded data; and outputting, to a host, partially encoded data including the cyclic redundancy check value, the first original data, and the encoded data.

14. The method of claim 13, further comprising:

after outputting the partially encoded data to the host, receiving the partially encoded data from the host;

detecting whether an error has occurred in the first original data and the encoded data by using the cyclic redundancy check value included in the partially encoded data;

requesting the host to re-transmit the partially encoded data when an error is detected, and allowing the first original data and the encoded data to remain by removing the cyclic redundancy check value from the partially encoded data when no error is detected; and recovering the second original data from the encoded data by performing an XOR operation on the encoded data and the select random data.

* * * * *